HIGH SPEED ASSOCIATIVE MEMORY

Filed Sept. 27, 1965 3 Sheets-Sheet 1

INVENTOR.
ANTHONY M. APICELLA JR.
JOHN T. FRANKS JR.
BY [signature]
ATTORNEY

Sept. 2, 1969 A. M. APICELLA, JR., ET AL 3,465,310

HIGH SPEED ASSOCIATIVE MEMORY

Filed Sept. 27, 1965 3 Sheets-Sheet 2

INVENTORS.
ANTHONY M. APICELLA JR.
JOHN T. FRANKS JR.

BY [signature]
ATTORNEY

Sept. 2, 1969 A. M. APICELLA, JR., ET AL 3,465,310

HIGH SPEED ASSOCIATIVE MEMORY

Filed Sept. 27, 1965 3 Sheets-Sheet 3

INVENTORS.
ANTHONY M. APICELLA, JR.
JOHN T. FRANKS, JR.
BY
ATTORNEY

United States Patent Office 3,465,310
Patented Sept. 2, 1969

3,465,310
HIGH SPEED ASSOCIATIVE MEMORY

Anthony M. Apicella, Jr., Massillon, and John T. Franks, Jr., Akron, Ohio, assignors to Goodyear Aerospace Corporation, Akron, Ohio, a corporation of Delaware Filed Sept. 27, 1965, Ser. No. 490,209
Int. Cl. G11b 5/12
U.S. Cl. 340—174 13 Claims

ABSTRACT OF THE DISCLOSURE

A high speed associative memory utilizing devices with bi-directional outputs achieved by utilizing the crossfield switching technique to achieve non-destructive readout. In essence, a high magnitude short duration solenoidal magnetic field is applied to change the rotational flux characteristics of an endless flux pattern around the aperture of a toroidal memory core element, and measuring the change of the rotational flux as a current on a sense winding positioned at a point where the greatest rotational flux change will take place. This current detection is measured in phase with a predetermined pattern associated with a compare word to determine the associative process.

This invention relates to a high speed associative memory, and more particularly to an associative memory system utilizing devices with bi-directional outputs achieved by utilizing the crossfield switching technique to achieve non-destructive readout of single aperture memory core elements.

Heretofore, it has been known that the art of associative memory is a relatively new art, but one fast growing and expanding to provide a computer logical function to enhance the operating characteristics of digital computers. Some associative memory systems are set forth in other patent applications also assigned to Goodyear Aerospace Corporation. For example, "Associative Memory System and Method" filed May 14, 1963, Ser. No. 280,391, now Patent No. 3,300,760; "An Associative Memory Apparatus and Method Using Elastic Switching Storage Elements," filed May 15, 1963, Ser. No. 280,602, now Patent No. 3,300,761; and "High Speed Hybrid Ferrite Film Associative Method and Apparatus," filed July 13, 1964, Ser. No. 382,221. However, due to the rapidly advancing state of this art, the associative memory systems defined in the above-identified applications are all rather slow in operation, rather large in size, relatively expensive to operate because of high current requirements, and expensive to build. A simple associative memory utilizing a simple memory storage element with relatively easy wiring and inherently fast operation is needed by the art.

Therefore, it is the general object of the present invention to avoid and overcome the foregoing and other difficulties of and objections to prior art practices and to meet the needs of the art by providing a high speed associative memory which utilizes single aperture toroidal or annular cores with a crossfield switching technique and subsequent phase detection in a sense amplifier to develop the associative function.

A further object of the invention is to provide a high speed associative memory system which is capable of operating at speeds of 100 nanoseconds per bit or less with power requirements of about 7.2 milliwatts per bit or less in a physical size of 2 times $10^4$ bits per cubic inch or less to provide an associative memory system which is fast, inexpensive to build and operate, and highly reliable in operation.

A further object of the invention is to provide a high speed associative memory system utilizing single aperture toroidal cores which system is relatively insensitive to drive current variations in either current rise time or amplitude, and which further has an associative operation which is relatively insensitive to temperature over the temperature range of minus 200° C. to plus 200° C.

A further object of the invention is to provide a high speed associative memory system which is parallel by word, serial by bit, and hence may have applications in correlator technology and digital to analogue conversion.

The aforesaid objects of the invention and other objects which will become apparent as the description proceeds are achieved by providing in a memory storage apparatus adapted for associative memory the combination of a memory storage unit comprising a plurality of toroidal cores arranged in aligned columns and rows so the rows represent words stored in memory and the columns represent corresponding bits of information, a solenoidal type interrogate winding surrounding each core in each aligned column, a sense winding passing through each core in each aligned row to connect the cores in each respective row in series, means to sequentially pulse a high magnitude short duration current pulse through each interrogate wire while simultaneously sensing on each respective sense wire the amount of flux change in each core in the aligned columns so interrogated, a compare word, means to simultaneously compare the corresponding bit of the compare word with each respective bit of each word stored in memory as each bit aligned column is sequentially interrogated, the last said means including detection means to measure the amount and direction of current induced into each respective sense winding by the current pulse through the respective interrogation winding, and means to represent the respective bits of the compare word as a current pulse in a specific direction and amplitude and to effect compare with only a selected portion of the current measured by the detection means, and means to determine which words stored in the memory storage unit have all bits in proper compare with the compare word.

For a better understanding of the invention reference should be had to the accompanying drawings, wherein.

While it should be understood that the principles of crossfield switching as applied towards magnetic core readout are adaptable to practically any type of core, the simplicity of this adaption to a single aperture toroidal magnetic core as producing non-destructive readout wtih good results at low expense makes this the preferred embodiment of the invention, and hence it has been so illustrated and will be so described.

Figure 1:
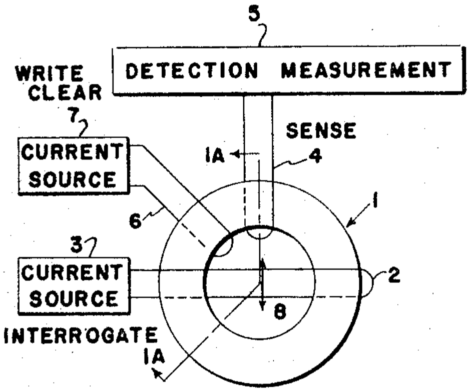
FIGURE 1 is a schematic illustration of a single aperture toroidal core having the necessary windings thereon to achieve the desired readout features of the invention.

With reference to the form of the invention illustrated in FIGURE 1 of the drawings, the numeral 1 indicates generally a magnetic permeable ferrite single aperture toroidal or annular core which incorporates an interrogate winding 2 wrapped in solenoidal fashion therearound and actuated by a current source 3. A sense winding 4 is utilized to detect flux changes in the core 1 as measured by detection and measurement equipment 5. In order to provide information for storage in the core 1 as flux patterns, a write/clear winding 6 actuated by a current source 7 is provided.

The interrogate winding 2 is adapted to provide an orthogonal interrogation field to the core 1. This field is applied substantially perpendicular to the axis of the core and causes the flux vector in the core to rotate from the arcuate or toroidal direction of the core into the direction of this magnetic field. Because of the nature of this cross-field switching technique, readout can occur in a few nanoseconds, and is relatively insensitive to current pulse width or the thermal environment of the core 1. The direction of the magnetic field applied by the interrogate winding 2 might be in either direction indicated by the double ended arrow 8.

Figure 1A:
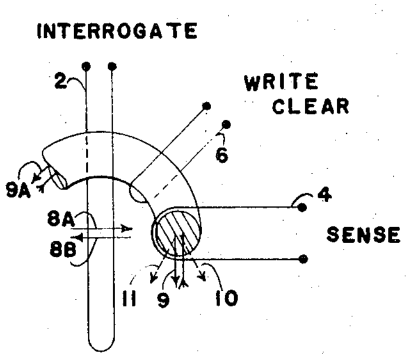
FIGURE 1A is a perspective cross-sectional view of the core at the portion where the sense winding is wrapped taken on line 1A—1A of FIGURE 1.

Thus, with reference to FIGURE 1A, the normal direction for a flux pattern in the core 1 would be either clockwise or counterclockwise as indicated by the vectors 9 and 9A. It should then be recognized that the magnetic field applied by the interrogate winding in a direction indicated by the arrow 8A will cause the flux vector in that portion of the core substantially parallel to the magnetic field, or perpendicular to the interrogate winding 2, to shift in the X direction as indicated by the dotted arrow 10. Conversely, if the magnetic field applied by the interrogate winding is in a direction indicated by the arrow 8B, it will cause a shift in the flux vector toward the X′ direction as indicated by the arrow 11. The magnitude of the current pulse passed through the interrogate winding 2 is not of critical importance, but must be sufficient to cause enough of a change in direction in the flux in that portion of the core surrounded by the sense winding 4 to be detectable as a current pulse induced into the sense winding 4.

Figures 1B, 2:
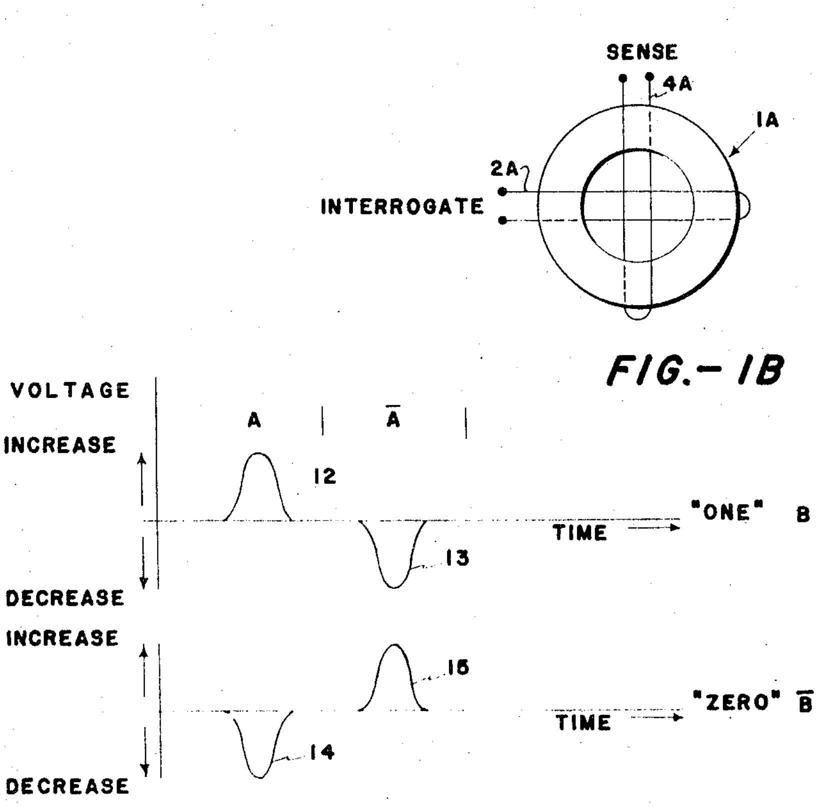
FIGURE 1B is a schematic illustration of a toroidal core showing the sense winding wrapped thereon in a slightly different manner.
FIGURE 2 is a graphical illustration of the readout obtained on the sense winding of the core of FIGURE 1 utilizing the crossfield switching technique, and how this technique may be used for interrogation to provide the necessary logical functions to achieve the associative memory operation.

The type of voltage signals obtained by the detection and measurement section 5 picked up by the sense winding for FIGURE 1 can best be illustrated by referring to the graph shown in FIGURE 2. Suppose a clockwise direction of flux pattern in the core of FIGURE 1 indicates a "ONE" is stored as a bit of information, which means conversely that a counterclockwise direction of flux indicates that a "ZERO" is stored as a bit of information in the core. Thus, if the direction of the current passed through the interrogate winding 2 is always in the same direction, the direction of flux change as indicated by arrows 10 and 11 in FIGURE 1A will vary dependent upon the direction of the flux path around the core 1. Therefore, suppose that a ONE, which could also be called a B bit of information is interrogated. As the orthogonal interrogating field is applied the magnetization vector in the core, as measured by the sense winding 4, will rotate from its rest position in such a way as to cause substantial alignment with the interrogating field. Usually, because of the high anisotropy in this direction, this rotation is generally quite small, usually being less than 50 milliradians. However, during the rise time of the field, the sense wire 4 wound around the core 1 sees a change in flux threading through it. This causes a voltage pulse to be generated on the sense line, which pulse in this particular situation will be in an up direction, as indicated by the pulse 12 on the top graph in FIGURE 2. When the interrogating field goes to ZERO the flux will again shift back to its initial position because the remainder of the field in the core drives it that way, and this flux change again will be detected by the sense winding 4 indicated as a downward voltage 13 on the graph in FIGURE 2. It should be noted that these separate voltage pulses 12 and 13 occur in a time sequence, with the duration of the entire pulse generally taking between about 50 and about 200 nanoseconds. Conversely, with a ZERO stored in the core 1, when the orthogonal interrogating magnetic field is applied a negative voltage pulse 14 will occur during the field rise time and a positive voltage pulse 15 will occur as the field is removed.

As stated in the above-identified patent applications, it is necessary in performing an associative memory operation to achieve either the "Equality" function or the "Exclusive OR" logical functions. In order to achieve these functions with the signals indicated in the graph of FIGURE 2, one needs only to look at substantially half or a selective portion of the signals obtained by the sense winding to see if it will provide the compare function. For example, suppose that the first pulses only were interrogated with an A bit of information which was only responsive to a positive pulse, or the pulse 12, indicating a B bit of information to perform the compare. Similarly, if an $\bar{A}$ bit of information selects only the latter half of the signal or during the removal of the interrogation pulse, and again is only responsive to a positive signal, it will only indicate compare when it sees the positive pulse 15 indicating a $\bar{B}$ or ZERO stored in memory. Thus, the logical function $AB+\overline{AB}$ may be detected by a positive signal and indicates the "Equality" function. Conversely, if the A detection selector is responsive only to a negative signal and similarly the $\bar{A}$ selective portion is responsive only to a negative signal then the logical function $A\bar{B}+\bar{A}B$, or the "Exclusive OR" function, is obtained. Thus, it is seen that the non-destructive readout of the core 1 is obtained using the orthogonal crossfield switching technique. The "Exclusive OR" or "Equality" functions are achieved by only viewing a selected portion of the signal obtained which is viewed in light of a known quantity looking for either a positive or negative as selectively dired so as to provide compare information.

For example, if the core 1 is storing a ONE or B bit of information and is viewed with an $\bar{A}$ bit of information looking for a positive signal, there will not be a compare, since only the negative signal 13 is seen. The selective readout of only a desired portion of the signal obtained utilizing the crossfield switching technique is what makes it possible to obtain the "Exclusive OR" and "Equality" logical functions.

FIGURE 1B illustrates a modified wrapping of a sense winding 4A around a toroidal core 1A having the interrogate winding 2A wrapped in typical solenoidal fashion therearound. In this case, the sense winding 4A passes around both sections of the toroidal core 1A which are substantially perpendicular to the interrogate winding 2A. This is done to take advantage of the opposite polarities induced into the two perpendicular legs of the core 1A when the orthogonal interrogate field is pulsed therearound by passing the current through the interrogate line 2A. A winding of this type brings forth two advantages. Namely, (1) it reduces the noise on the sense line 4A considerably by permitting the sense line to have egress from the core at its point of emittance. (2) A two turn sense winding is obtained which permits reduction of the current necessary to create the orthogonal interrogation field.

Thus, it should be understood that the significant properties possessed by a core operating as described above, are the lack of a threshold, the relatively large operational tolerances in field amplitude and field rise time, and the large insensitivity to temperature variations. The limiting factors are sense line noise and sense amplifier sensitivity. In actual testing on the toroidal cores as indicated in FIGURE 1, operational outputs have been achieved on the sense winding from one millivolt to 130 millivolts corresponding to rotations of the magnetization vector in a standard conventional 50/30 toroidal core with a 20 nanosecond rise time field of from 30 milliradians to approximately 350 milliradians. The maximum output obtainable was 2.1 volts with a magnetization vector rotation of $\pi/2$ radians. The reason for the absence of a threshold is due to the nature of the hysteresis loop in the solenoidal direction. A simple review of the hysteresis loop for this type of a core substantiates this fact

SYSTEM OPERATION

Figure 3:
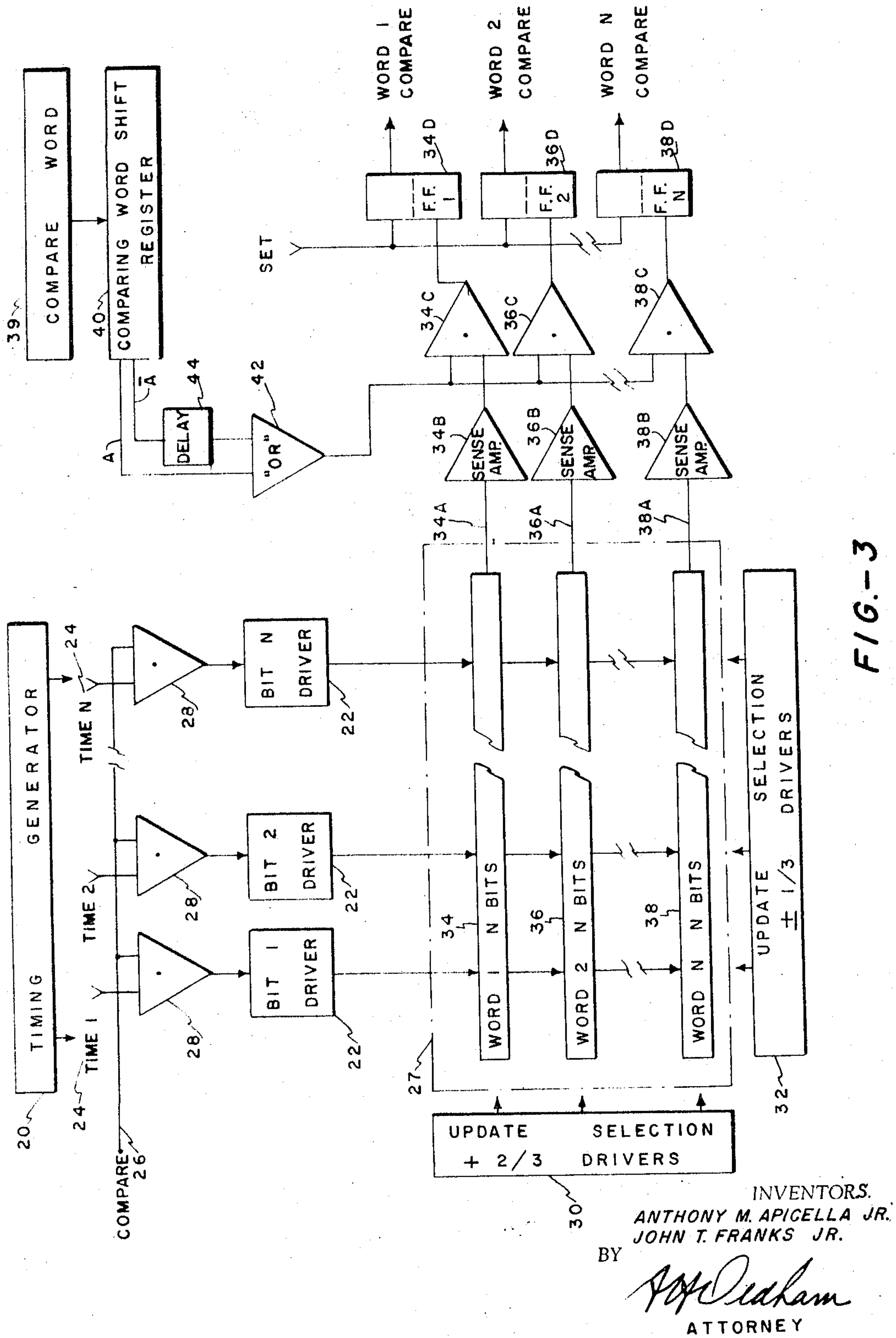
FIGURE 3 is a schematic block diagram of an associative memory system utilizing the single toroidal core and principle of interrogation thereof illustrated in FIGURES 1 and 2.

With reference to FIGURE 3, a simple associative memory system utilizing the core principle set forth above with reference to FIGURE 1, is illustrated. Specifically, a timing generator, indicated by numeral 20, operatively drives a plurality of bit drivers indicated generally by numerals 22, at sequential time intervals as indicated generally by time intervals *l* through *n* indicated by numeral 24. These operate as the result of a compare signal 26 sent as an additional input to a plurality of conventional driver switches, indicated generally by numerals 28. The toroidal cores actually form a memory unit indicated by the dotted block 27 and are arranged in aligned columns and rows so that each column represents corresponding bits and each row represents a word of a certain number of bits, such as *n* bits. The drivers 22 are actually connected to the interrogation lines and drive or interrogate sequentially each column of bit aligned cores. In order to write words into the memory unit 27, an up date selection of plus ⅔ drivers, indicated by block 30, is series connected to the cores comprising each word, while an up date selection of plus and minus ⅓ drivers, indicated by block 32 is bit orientated in columns so that each bit in the memory unit 27 can be individually set by providing the proper plus or minus ⅓ driver in conjunction with the plus ⅔ driver. It should be understood that in setting cores of this type to write words into the memory unit 27, all the cores are initially set in a flux direction indicating ZEROS with writing then done by simply changing those cores which require their flux shifting to a ONE direction.

In order to provide readout of each word, indicated by numerals 34 through 38 stored in memory, a sense winding is series wound around each core comprising each word. These sense windings 34A through 38A feed into respective sense amplifiers 34B through 38B which simply amplifies their output signal. It should be understood that the output signal will be like one or the other of the signals indicated in the graph of FIGURE 2. The amplified signals are then sent to respective switches 34C through 38C which also receive an input from a compare word shift register 40 which in turn receives its information from a compare word 39 to be compared with each word stored in the memory unit 27. The shift register 40 sequentially provides either an A or $\bar{A}$ signal based on the information from the compare word 39 as inputs to the switches 34C through 38C, In order to selectively determine what portion of the signal sent by the sense amplifiers 34B through 36B will be compared, the A signal is of a time duration to only selectively review the first half of the B and $\bar{B}$ signals presented as it passes through a conventional OR gate 42. Conversely, the $\bar{A}$ signal is passed through a conventional delay gate 44 so that it will only selectively view the latter half of the input signals from the sense amplifiers 34B through 38B to the switches 34C through 38C. Thus, as more completely explained above, each core representing a bit of information is individually sensed and compared to a respective core of the compare word 39 by the signals A or $\bar{A}$ sent from the comparing word shift register 40.

The detection scheme operates thusly: Each sense amplifier 34B through 38B detects only negative signals. Therefore, when a B is in memory the sense amplifier output occurs at time $\bar{A}$ as explained above with reference to FIGURE 2. When this situation exists, the simultaneous occurrence of B and $\bar{A}$ will send a negative signal through the respective switches 34C through 38C and thus reset one of the respective flip-flops 34D through 38D indicating a mismatch. The same sequence is true if $\bar{B}$ and A occur.

It should thus be understood that as each column is sequentially interrogated the circuitry will immediately determine whether the respective bit compares with the corresponding bit of the compare word 39. If all of the bits in a word indicate compare, then that word is immediately detected and indicated as a word which compares completely with the compare word 39. In other words, this technique readily determines if all the bits comprising each word will compare with all the bits of the compare word 39.

Figure 4:
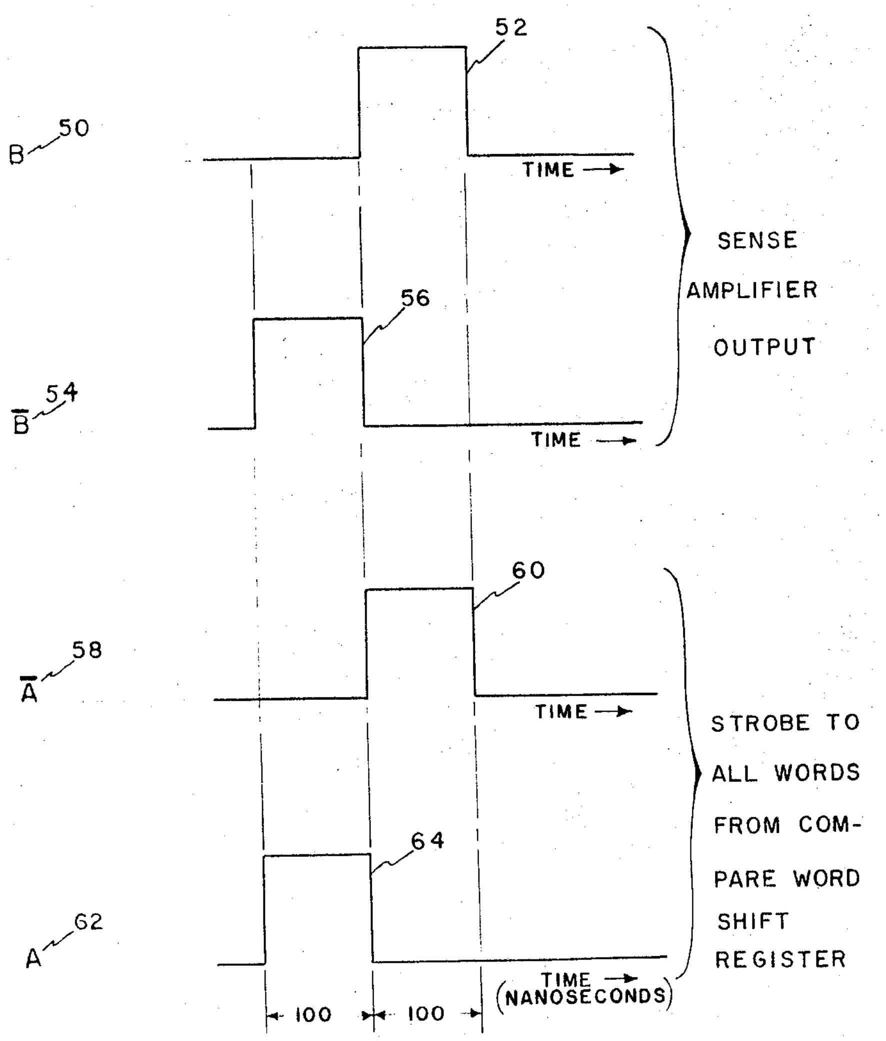
FIGURE 4 is a graphical illustration of the function of the sense amplifiers and the strobe pulses utilized to achieve the associative memory function.

FIGURE 4 illustrates that a B output 50 from the sense amplifiers may include only a positive voltage portion 52 which happens to occur on the latter half of the pulse. Similarly, a $\bar{B}$ signal 54 out of the sense amplifiers might detect only a raised voltage portion 56, which happens to occur on the first half of the output pulse. Thus, an $\bar{A}$ signal 58 from the compare word register 40 is passed through the delay 44 so that its positive voltage pulse 60 only detects the latter half of the sense amplifier output signals, and thus detects only the positive voltage pulse 52 from the B output 50. Conversely, an A signal 62 from the compare word shift register 40 will have a positive voltage pulse 64 on the first half of the pulse and will compare to the positive voltage pulse 56 representing the $\bar{B}$ information 54. Thus, in effect this provides the "Exclusive OR" logical function. This drawing indicates that the voltage pulses 52, 56, 60, and 64 each will be about 100 nanoseconds in length, although as stated above, this time pulse will vary upon the particular materials used in the make up of the memory storage cores, the strength of the strobing current, the interrogate rise time, and the storage time of the sense amplifier.

In forming the memory storage unit comprising the words 34 through 38 in FIGURE 3, each bit if represented by any suitable type of memory storage element, such as the toroidal core 1 of FIGURE 1. Extreme care must be taken to insure that all solenoidal or interrogation windings run at right angles to the sense windings. Writing into memory is serial by word and parallel by bit which is accomplished by the normal word select techniques and the up date selection sections 30 and 32. The total time required in a search by using the timing generator 20 is equivalent to the time required for one core to switch times the number of bits to be searched. Thus, if switching time is 100 nanoseconds, the word length is 10, the time required to execute a search would be 1 microsecond. However, if a core were utilized where the solenoidal or crossfield switching technique could be utilized in a twenty-five nanosecond period, the same word length as above would require only two-hundred fifty nanoseconds.

One characteristic which may be of value in correlation is the knowledge of which bits and how many did not compare. If interrogation of a compare word takes place starting at the most significant bit, a mismatch at any of the most significant bits results in an early resetting or non-compare signal. Any mismatch of a least significant bit will result in a late non-compare signal. This change in the reset cycle or non-compare signal might be used to provide a variance of brightness to a word location indicator. In other words, as the comparing word became closer to the exact value of the memory word, the indicator would become brighter until an exact match would occur. The indicator might be replaced by a ramp generator whose voltage value at mismatch indicated the degree of mismatch between the memory word and the comparing word.

In some systems it might be desirable for parallel readout of a particular word in memory. This operation can be done in very little time, and still be non-destructive. This could be accomplished by adding another set of solenoid windings in the word direction for each word. Then, the up date section 32 with the plus or minus ⅓ drivers could be used to serve as the sense windings. Energizing a particular word solenoid winding would result in non-destructive parallel readout of that word and would require only the time consumed to effect the partial rotational switching inherent in the crossfield switching technique.

Instead of the toroidal core indicated in FIGURE 1, the use of a thin ferrite plate with square holes, printed circuitry solenoid windings and sence windings, and the use of a drive switch matrix might increase the system speed while reducing the power required, simplify the wiring of the memory, reduce the hardware associated with the memory, and reduce the system size. A suitable ferrite film for this purpose is illustrated in the above-identified patent application Ser. No. 382,221 filed July 13, 1964. A ferrite plate having the square holes would reduce the effect of sense lines skew on the magnitude of the induced signal to thereby reduce the noise generated upon the application of the orthogonal interrogation magnetic field since creation of an orthogonal field with the solenoidal winding is more easily achieved in the ferrite film than with toroids. Further, closer packing densities and smaller bit sizes can be achieved to provide a physical size of 2 times $10^4$ bits per cubic inch. Further, because of the homogeneous medium and precision geometry of the winding possible on the ferrite film, transmission line theory can be used in the design of the solenoidal winding. This will result in obtaining the fastest possible rise time pulses transmitted along the solenoidal winding and permits impedance matching of the winding with the current drivers. A power requirement of about 7.2 milliwatts/bit or ress will provide adequate drive. Thus, it appears that the most advantageous way to utilize this solenoidal non-destructive readout principle is with the ferrite plate or "waffle-iron" type construction described in the above-identified patent application.

It is seen that the objects of the invention have been achieved by providing an associative memory which can utilize single aperture toroidal cores, thin film ferrite plates, or other suitable memory storage devices by utilizing the crossfield or orthogonal rotational mode of switching where switching occurs within the rise time of the drive field in a very short time period to produce bipolar outputs induced onto a sense line which can be selectively read out to provide the "Equality" or "Exclusive OR" logical functions. Thus, any magnetic device which induces bipolar outputs upon interrogation by an orthogonal magnetic field can be utilized. The nature of orthogonal interrogation to provide rotational switching is relatively insensitive to changes in drive field amplitude, drive field rise time, or thermal environment. The system is readily adaptable to a parallel by word serial by bit associative memory operation, which therefore makes it applicable to correlator technology and digital to analog conversion.

While in accordance with the patent statutes, only one best known embodiment of the invention has been illustrated and described in detail, it is to be particularly understood that the invention is not limited thereto or thereby, but that the inventive scope is defined in the appended claims.

What is claimed is:

1. In a memory storage apparatus adapted for associative memory the combination of a memory storage unit comprising a plurality of single aperture cores arranged in aligned columns and rows so the rows represent words stored in memory and the columns represent corresponding bits of information and where the cores represent bits of information as closed flux patterns around the apertures, a solenoidal wound interogate winding surrounding each core in each aligned column, a sense winding passed through the aperture of each core in each aligned row substantially perpendicular to the interrogate winding to connect the cores in each row in series, means to sequentially pulse a high magnitude, short duration current pulse through each interrogate winding, while simultaneously sensing on each respective sense winding a voltage pulse representing the amount of rotational flux change in each core in the aligned column so interrogated, a compare word, means to simultaneously compare the corresponding bit of the compare word with each respective bit of each word stored in memory as each bit aligned column is sequentially interrogated, said means including detection means to measure the amount and direction of voltage pulse induced into each respective sense winding by the current pulse through the respective interrogation winding, and means to represent the respective bit of the compart word as a current pulse in a specific direction and amplitude and to effect compare with only a selected portion of the current measured by the detection means, and means to determine which word stored in memory storage unit have all bits in proper compare with the compare word.

2. A memory storage apparatus according to claim 1 where the detection means measures and amplifies in phase only positive voltage pulses detected by the sense windings and the means representing the respective bits of the compare word represents them as positive voltage pulses in a specific time phase relation whereby compare is only achieved when both the positive voltage pulses are in the proper time phase.

3. A memory storage apparatus according to claim 1 where the detection means measures and amplifies in phase only negative voltage pulses detected by the sense windings and the means representing the respective bits of the compare word represents them as negative voltage pulses in a specific time phase relation whereby compare is only achieved when both the negative voltage pulses are in the proper time phase.

4. In an apparatus to effect readout of a single aperture toroidal magnetic core the combination of a single aperture magnetic permeable magnetic core, an interrogate winding passed therearound in solenoidal fashion, a sense winding through the aperture substantially perpendicular to the interrogate winding to detect rotational flux changes along portions of the core substantially perpendicular to the interrogate winding, means to represent a bit of information as a rotational flux pattern around the aperture of the core, means to pass a high magnitude short duration current pulse through the interrogate winding, means to measure the direction and amplitude of the rotational flux change in the core caused by the current pulse through the interrogate winding by measuring the current induced into the sense winding as a voltage pulse, and means to compare a preselected portion of the voltage pulse measured by sense winding with a voltage pulse representing a known bit of information to determine if the bit of information stored in the core compares with the known bit of information.

5. An apparatus according to claim 4 where the current pulse through the interrogate winding subjects the core to a short pulsed external magnetic field surrounding and directed substantially perpendicular to the axis of the core, and means to compare the rotational flux change in the core measured by last said means during the rise time of the external magnetic field with a flux change representing a known bit of information.

6. An apparatus according to claim 5 where the means to compare effects comparison of the flux change in the core during the decay of the external magnetic field with a flux change representing a known bit of information.

7. An apparatus according to claim 4 which includes a second interrogate winding wound in solenoidal fashion around the core so that a current pulse passed through said second interrogate winding will create an orthogonal magnetic field to cause flux field rotation around the core in a plane parallel to the plane of the magnetic field, and second sense wire means passing through each core to measure the flux change around each core.

8. In a memory storage apparatus adapted for associative memory the combination of a memory storage unit comprising

- a ferrite film having a plurality of square holes arranged in aligned columns and rows so the rows represent words stored in memory and the columns represent corresponding bits of information, said film capable of forming rotational flux patterns in desired directions around each hole to represent bits of information,
- a solenoidal wound interrogate winding surrounding the film in alignment with each aligned column,
- a sense winding passed through each hole in each aligned row to connect the holes in each row in series,
- means to sequentially pulse a high magnitude, short duration current pulse through each interrogate winding to produce a bi-polar rotational flux change in portions of the film parallel to the magnetic field caused by the current pulse, while simultaneously sensing on each respective sense winding the amount of flux change in the film around each hole in the aligned column so interrogated,
- a compare word,
- means to simultaneously compare the corresponding bit of the compare word with each respective bit of each word stored in memory as each bit aligned column is sequentially interrogated, said means including
  - detection means to measure the amount and direction of the rotational flux change around each hole and represent it as voltage pulses induced into each respective sense winding by the current pulse through the respective interrogate winding, and
- means to represent the respective bit of the compare word as a voltage pulse in a specific direction and amplitude and to effect compare with only a selected portion of the voltage pulses by the detection means, and
- means to determine which words stored in memory storage unit have all bits in proper compare with the compare word.

9. A memory storage apparatus according to claim 8 where the interrogate windings are sequentially pulsed from the most significant bits toward the least significant bits and which includes means to tell which bit in each word stored in the memory unit first indicates non-compare.

10. A memory storage apparatus according to claim 8 which includes a plurality of second interrogate windings each wound in solenoidal fashion around the film in line with a separate aligned row of holes to connect the holes in series so that a current pulse passed through said second interrogate windings will create an orthogonal magnetic field to cause flux field rotation around each hole in a plane parallel to the plane of the magnetic field, and second sensing wire means passed through each hole in each aligned column to connect the holes in each column in series and measure the flux change around each hole.

11. In an apparatus to effect an associative memory operation the combination of

- a plurality of magnetic permeable single aperture cores arranged in aligned columns and rows,
- means to place a bit of information as an endless rotational flux pattern around the aperture of each core so that each row of cores represents a word stored in memory and each column of cores represents the same bit in each word,
- means to sequentially interrogate each column of cores by passing a short pulsed magnetic field therearound perpendicular to the axis thereof in solenoidal fashion to effect rotational flux changes in portions of the cores parallel to the field first in one direction when the field is applied and back to the original position when the field is removed,
- means to simultaneously selectively measure the direction and time phase of movement of the rotational flux in the cores of each column of cores in said portions parallel to the magnetic field, and
- means to compare a specific time phase of the selectively measured movement of rotational flux with a known movement representing a known bit of information.

12. An apparatus according to claim 11 where the means to selectively measure the direction and time phase of movement of the rotational flux in the cores only measures rotational flux movements which create positive voltage pulses when sensed by a winding surrounding the core on a portion parallel to the magnetic field, and the time phase of said positive voltage pulses are compared with a time phased positive voltage pulse representing a known bit of information.

13. An apparatus according to claim 11 where the means to selectively measure the direction and time phase of movement of the rotational flux in the cores only measures rotational flux movements which create negative voltage pulses when sensed by a winding surrounding the core on a portion parallel to the magnetic field, and the time phase of said negative voltage pulses are compared with a time phased negative voltage pulse representing a known bit of information.

References Cited

UNITED STATES PATENTS

| | | | |
|---|---|---|---|
| 3,300,761 | 1/1967 | Tattle | 340—174 |
| 2,905,931 | 9/1959 | Lubkin | 340—174 |
| 3,178,692 | 4/1965 | Hamilton | 340—174 |
| 3,339,181 | 8/1967 | Singleton et al. | 340—174 XR |

BERNARD KONICK, Primary Examiner

GARY M. HOFFMAN, Assistant Examiner

U.S. Cl. X.R.

340—146.2